(12) United States Patent  
Furuya et al.

(10) Patent No.: US 8,004,779 B2
(45) Date of Patent: Aug. 23, 2011

(54) LENS DRIVE DEVICE

(75) Inventors: Yukio Furuya, Nagano (JP); Noboru Ootsuki, Nagano (JP)

(73) Assignee: Nidec Sankyo Corporation (JP)

( * ) Notice: Subject to any disclaimer, the term of this patent is extended or adjusted under 35 U.S.C. 154(b) by 150 days.

(21) Appl. No.: 12/239,240

(22) Filed: Sep. 26, 2008

(65) Prior Publication Data

US 2009/0086344 A1 Apr. 2, 2009

(30) Foreign Application Priority Data

Sep. 26, 2007 (JP) ................................. 2007-249916

(51) Int. Cl.
*G02B 7/02* (2006.01)
(52) U.S. Cl. ........................ 359/824; 359/822; 359/694
(58) Field of Classification Search .................... 359/824
See application file for complete search history.

(56) References Cited

U.S. PATENT DOCUMENTS

| | | | | |
|---|---|---|---|---|
| 5,740,470 A * | 4/1998 | Kitagawa et al. | ............... | 396/52 |
| 7,271,511 B2 * | 9/2007 | Osaka | ..................... | 310/12.27 |
| 7,298,562 B2 * | 11/2007 | Sue et al. | ....................... | 359/819 |
| 7,394,603 B2 * | 7/2008 | Shiraki et al. | .................. | 359/819 |
| 7,433,136 B2 * | 10/2008 | Ichikawa et al. | .............. | 359/811 |
| 2002/0112543 A1 * | 8/2002 | Noguchi | ......................... | 73/618 |
| 2007/0053082 A1 * | 3/2007 | Sue et al. | ....................... | 359/819 |
| 2010/0134771 A1 * | 6/2010 | Ono et al. | ....................... | 355/30 |

FOREIGN PATENT DOCUMENTS

| | | |
|---|---|---|
| JP | 2005-128392 | 5/2005 |
| JP | 2005-165058 | 6/2005 |
| JP | 2007-148354 | 6/2007 |

\* cited by examiner

*Primary Examiner* — Jessica T Stultz
(74) *Attorney, Agent, or Firm* — Cantor Colburn LLP

(57) ABSTRACT

A lens drive device may include a movable body having a lens and a coil, a support body movably supporting the movable body, a magnetic drive mechanism having a magnet for driving the movable body together with the coil, a restricting member for restricting movement of the movable body due to an electromagnetic force generated when an electric current is supplied to the coil, a magnetic member disposed in the movable body to be magnetically attracted by the magnet. In a non-energized state where the coil is not energized, following relationships are satisfied:
$W > F1$, $W > F2$, and $W < F1 + F2$.
wherein a force with which the restricting member urges the movable body toward a non-energized position is "$F1$"; a force in the optical axis direction with which the magnetic member is attracted by the magnet is "$F2$"; and a weight of the entire movable body is "$W$".

4 Claims, 3 Drawing Sheets

LENS DRIVE DEVICE

CROSS REFERENCE TO RELATED APPLICATION

The present invention claims priority under 35 U.S.C. §119 to Japanese Application No. 2007-249916 filed Sep. 26, 2007 the entire contents of which are incorporated herein by reference.

FIELD OF THE INVENTION

At least an embodiment of the present invention may relate to a lens drive device in which a lens is driven to move in an optical axis direction for forming an image of an object to be photographed.

BACKGROUND OF THE INVENTION

As cell phones with cameras in which a camera is mounted have become popular in recent years, chances photographing various objects to be photographed by using the cell phone have increased. For example, there is a case that an object such as a friend or landscape which is apart from a lens of a camera to some extent is photographed (normal photographing) and, alternatively, there is a case that an object such as a timetable for bus or petals of a flower at a position near the lens of the camera is photographed (close-up photographing). In the close-up photographing (macro-photographing), a lens position of a camera is required to locate at a position nearer on an object side than a lens position at the time of normal photographing. Therefore, this type of photographing lens system is provided with a drive mechanism for driving a lens to move in the optical axis direction. The drive mechanism is driven by changing a switch to move a lens in the optical axis direction (see, for example, Japanese Patent Laid-Open No. 2005-128392, Japanese Patent Laid-Open No. 2005-165058 and Japanese Patent Laid-Open No. 2007-148354).

A cell phone with camera or the like is often put in a pocket or a bag and carried and thus a large shake or impact may be applied to the cell phone at the time of carrying (when it is not used). In other words, in a state where a cell phone is not used, a drive mechanism for moving a lens is not operated and thus the lens is easily vibrated due to a shake or an impact. As a result, the lens is easily displaced or damaged by the shake or the impact.

In order to prevent this problem, the lens drive device which is disclosed in the above-mentioned former two Patent References include a yoke, a base, a magnet and a coil, a lens support body which supports a lens, a front side spring (object side spring), a rear side spring (image sensor element side spring) and another base. When energization to the coil is stopped, the front side spring and the rear side spring apply urging forces to the lens support body so that the lens support body is pressed against the base. In this manner, even when a large shake or impact occurs at the time of carrying, shaking and backlash are less likely to occur in the lens support body to provide the lens drive device with a shock resistant property.

Further, the lens drive device disclosed in the last Patent Reference includes a movable lens body, a fixed body which movably supports the movable lens body in an optical axis direction of a lens, a magnetic drive mechanism for moving the movable lens body in the optical axis direction and a holder support. Further, a coil is provided in the movable lens body and a magnet is provided in the fixed body as the magnetic drive mechanism. In addition, a magnetic spring (magnetic member) is provided in the movable lens body.

The magnetic spring is magnetically attracted by the magnet which is provided in the fixed body. In this manner, when energization to the coil is stopped (not-energized time), the movable lens body is abutted with and pressed down to the fixed body by the magnetic attractive force so that the movable lens body does not wobble.

More specifically described with reference to half sectional schematic views in FIGS. 4(a) through 4(d). FIGS. 4(a) through 4(d) are cross sectional schematic views showing conventional lens drive devices. FIGS. 4(a) and 4(b) are schematic views showing a lens drive device 100 disclosed in the above-mentioned former two Patent References. Further, FIGS. 4(c) and 4(d) are schematic views showing a lens drive device 100 disclosed in the last Patent Reference.

As shown in FIGS. 4(a) and 4(b), the conventional lens drive device 100 is structured of a sleeve 101, a yoke 102, a cover 110 which is provided on an object side in an optical axis direction so as to interpose the yoke 102, a base portion 111 which is provided on an image sensor element side, a coil 103, a magnet 104, plate springs 105, abutting parts 107 and 108 for restricting a moving amount in the optical axis direction of the sleeve 101. Further, in FIGS. 4(c) and 4(d), in addition to the above-mentioned structure, a magnetic member 106 for structuring a magnetic spring is disposed on an upper end face in the optical axis direction of the sleeve 101 and on an under side of the upper plate spring 105.

An operation of the lens drive device 100 will be described below with reference to FIGS. 4(a) through 4(d). FIG. 4(a) is a view showing a state where the coil is not energized, i.e., at a home position, and FIG. 4(b) is a view showing a state where the coil is energized, i.e., a state where the sleeve 101 has been moved on the object side. Similarly, FIG. 4(c) is a view showing a state at a home position and FIG. 4(d) is a view showing a state where the sleeve 101 has been moved on the object side.

In the lens drive device 100 shown in FIG. 4(a), when the coil 103 is not energized, the abutting part 107 of the sleeve 101 is pressed to be abutted with the base 111 by urging forces of the plate springs 105 and thus the sleeve 101 is located at a non-energized position. Further, when the coil 103 is energized, the sleeve 101 is moved in the optical axis direction to a position shown in FIG. 4(b). In this case, a driving force (thrust force) by the coil 103 and the urging forces by the plate springs 105, i.e., an elastic force for restricting movement of the sleeve 101 act on the sleeve 101. Therefore, the sleeve 101 is stopped at a position where these forces are balanced, i.e., at an energized position.

On the other hand, in the lens drive device 100 shown in FIG. 4(c), the magnetic member 106 for structuring a magnetic spring together with the magnet 104 is magnetically attracted by the magnet 104 and the sleeve 101 is pressed down and abutted with the base 11 by the magnetic attractive force when the coil 103 is not energized and thus the sleeve 101 is located at a non-energized position. The force Fp with which the magnetic member 106 urges the sleeve 101 is set larger than the weight Wp of the sleeve 101. In other words, in this non-energized state in the lens drive device 100, the plate springs 105 hardly apply their elastic forces to the sleeve 101. On the other hand, when the coil 103 is energized, the sleeve 101 is moved in the optical axis direction to a position shown in FIG. 4(d). In this case, a driving force of the coil 103 and the urging forces (elastic force) of the plate springs 105 act on the sleeve 101, and the sleeve 101 is stopped at a position where these forces are balanced with each other and thus the sleeve 101 is located at an energized position. In this lens drive device 100, a magnetic attractive force between the magnetic member 106 and the magnet 104 is smaller than the driving force of the coil 103 but affects movement of the sleeve 101.

However, in the lens drive device 100 shown in FIG. 4(*a*), when the coil 103 is not energized (home position), the abutting part 107 of the sleeve 101 is pressed to be abutted with the base 111 by the elastic forces (urging force) of the plate springs 105 and thus the sleeve 101 is located at the non-energized position. Therefore, the plate springs 105 are always resiliently bent both at the not-energized time and at the energized time of the coil 103. In addition, in the state where the sleeve 101 is moved to the object side shown in FIG. 4(*b*), the plate springs 105 which have been already resiliently bent at the home position as shown in FIG. 4(*a*) are required to be resiliently bent further more. Therefore, the metal spring may occur metal fatigue or permanent deformation. In addition, when the plate spring 105 has been continuously used at the spring deflection limit value or its vicinity of metal material of the plate spring 105, fatigue failure is likely to occur to the plate spring 105.

Especially, according to miniaturization demand for an actuator in recent years, when the plate spring 105 is made further smaller or thinner, the strength of the plate spring 105 becomes weaker or the plate spring 105 becomes easily to bend and thus fatigue failure may occur.

On the other hand, in the lens drive device 100 as shown in FIG. 4(*c*), when the coil 103 is not energized, the sleeve 101 is pressed to be abutted with the base 111 by using the magnetic attractive force between the magnetic member 106 and the magnet 104 and thus, as shown in FIG. 4(*c*), the plate springs 105 hardly bend resiliently at the home position (non-energized position). However, when the size of the lens drive device 100 is reduced with miniaturization demand for an actuator, the magnetic member 106 becomes located at a nearer position to the magnet 104. As a result, the magnetic attractive force of the magnet 104 to the magnetic member 106 becomes larger. Especially, the magnetic attractive force in the radial direction becomes larger than that in the thrust direction. Therefore, assembling accuracy is required to enhance so that the sleeve 101 and the magnet 104 are concentrically disposed with respect to the optical axis and thus workability is deteriorated. In other words, when the assembling accuracy is not satisfactory, after the sleeve 101 and the magnet 104 have been assembled into the lens drive device 100, the sleeve 101 may be inclined by the effect of the magnetic attractive force in the radial direction and, as a result, its optical characteristic is deteriorated.

SUMMARY OF THE INVENTION

In view of the problems described above, at least an embodiment of the present invention may advantageously provide a lens drive device which is capable of reducing its size while assuring its shock resistant property.

Thus, according to at least an embodiment of the present invention, there may be provided a lens drive device including a movable body having a lens and a coil, a support body which movably supports the movable body in an optical axis direction of the lens, a magnetic drive mechanism which is provided with a magnet for driving the movable body in the optical axis direction together with the coil that is mounted on the movable body, a restricting member for restricting movement in the optical axis direction of the movable body due to an electromagnetic force which is generated when an electric current is supplied to the coil, and a magnetic member which is disposed in the movable body as a part of the movable body to be magnetically attracted by the magnet. In addition, in a non-energized state where the coil is not energized, following relationships are satisfied:

$W>F1$, $W>F2$, and $W<F1+F2$ wherein "F1" is a force with which the restricting member urges the movable body in the optical axis direction, "F2" is a force in the optical axis direction with which the magnetic member is attracted by the magnet, and "W" is an entire weight of the movable body.

In this case, it may be structured that the movable body is provided with a sleeve which is movably supported in the optical axis direction by the restricting member, and the sleeve is moved to an energized position from a non-energized position by the magnetic-drive mechanism, and the forces "F1" and "F2" are forces which urge the sleeve toward a non-energized position side at the non-energized position. Specifically, it is preferable to structure that the restricting member is a plate spring, the magnet is fixed on the support body, and the magnetic member is disposed at a tip end portion on an energized position side of the sleeve. Further, it is preferable that the plate spring comprises two pieces of metal plate spring which are attached to both ends in the optical axis direction of the sleeve and are used for supplying an electric current to the coil. Further, it is preferable that the magnetic member is disposed at the tip end portion on the energized position side of the sleeve and is disposed on the energized position side of the plate spring which is disposed on the energized position side.

According to at least an embodiment of the present invention, in a lens drive device which is provided with a movable body, a support body and a magnetic drive mechanism, a restricting member for restricting movement in an optical axis direction of the movable body and a magnetic member which is magnetically attracted by a magnet are provided. Further, in a non-energized state where the coil is not energized, following relationships are satisfied:

$W>F1$, $W>F2$, and $W<F1+F2$ wherein "F1" is a force with which the restricting member urges the movable body in the optical axis direction, "F2" is a force in the optical axis direction with which the magnetic member is attracted by the magnet, and "W" is an entire weight of the movable body. Therefore, a lens drive device which is capable of reducing its size while assuring its shock resistant property is obtained. In at least an embodiment of the present invention, the entire movable body means, as described with reference to the following specific embodiments, the entire of the sleeve, the coil and a magnetic ring which are moved by the magnetic-drive mechanism, i.e., the entire movable body means the entire which is movably supported by the plate spring as the restricting member.

In the conventional lens drive device, in order to press the movable body against the support body, an urging force by the restricting member which is larger than the weight of the entire movable body is required ("W<F1" or "W<F2"). In this case, the restricting member is resiliently bent toward the non-energized position side in order to press the movable body against the support body to maintain the non-energized position and, when the coil is energized, the restricting member is resiliently bent toward the energized position which is an opposite to the non-energized position and thus its bending amount when the coil is energized becomes larger as described above. Therefore, when the size of the lens drive device is further reduced, the restricting member may easily occur a fatigue failure. However, in the lens drive device in accordance with at least an embodiment of the present invention, the following relationships are satisfied: $W>F1$, $W>F2$, and $W<F1+F2$ Therefore, an urging force larger than the weight of the entire movable body is not required in the restricting member by providing a magnetic member. Accordingly, the restricting member can be prevented from being resiliently bent larger when the coil is not energized and thus fatigue failure of the restricting member can be prevented.

In accordance with at least an embodiment of the present invention, the relationship of "W<F1+F2" is satisfied. Therefore, even when a force which is parallel to the force "F1" of the magnetic attraction force acting between the magnetic member and the magnet becomes smaller, the movable body is sufficiently pressed against the support body by utilizing the urging force of the restricting member.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings.

Figure 1A:
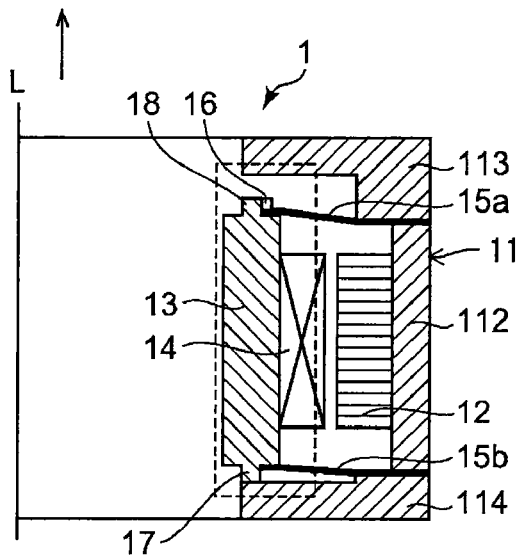
FIGS. 1(a) and 1(b) are cross sectional schematic views showing a right half side of a lens drive device in accordance with an embodiment of the present invention, in which its left half side is omitted from the center.
Figure 1B:
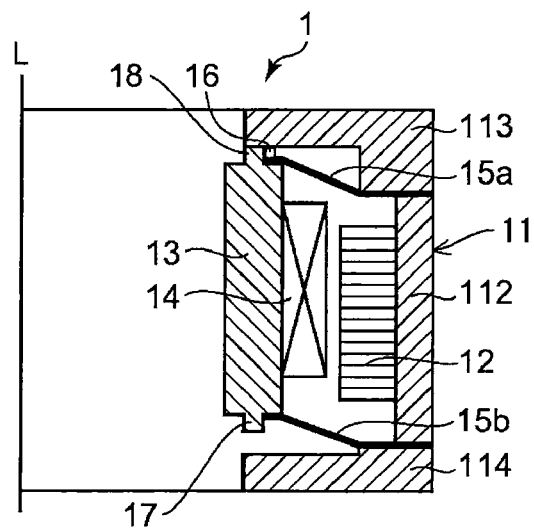

FIGS. 1(a) and 1(b) are cross sectional schematic views showing a right half side of a lens drive device 1 in accordance with an embodiment of the present invention. In the lens drive device 1, FIG. 1(a) is a view showing a state where a coil 14 is not energized, in other words, a sleeve 13 is located at a normal photographing position, i.e., at a non-energized position. FIG. 1(b) is a view showing a state where the coil 14 is energized, in other words, the sleeve 13 is located at a close-up photographing position, i.e., at an energized position in the lens drive device 1. Detail description of the entire structure of the lens drive device 1 is omitted because a well-known lens drive device may be applied to this embodiment. Further, FIGS. 1(a) and 1(b) show only a right half side with respect to the optical axis "L" of a lens when the lens drive device 1 is cut longitudinally. Further, in FIGS. 1(a) and 1(b), for convenience of description, an upper side in the drawing is referred to as a front side which is closer to an object to be photographed and a lower side is referred to as a rear side which is closer to an imaging element. The lens is provided on an inner peripheral side of the sleeve 13, i.e., on the left side of the sleeve 13 in FIG. 1(a) but it is a well-known structure and thus its description is omitted.

In FIGS. 1(a) and 1(b), the lens drive device 1 includes a support body 11 having a yoke 112, which movably supports a sleeve 13 provided with a lens (not shown) in an optical axis "L" direction, a cover 113 which is arranged on an object to be photographed side in the optical axis direction so as to interpose the yoke 112, and a base portion 114 which is arranged on an image sensor element side. In addition, the lens drive device 1 also includes a magnet 12 which is fixed to the support body 11, the sleeve 13 which is movably supported in the optical axis direction "L" by the support body 11, a coil 14 which is disposed on an outer peripheral face of the sleeve 13 so as to face the magnet 12, a plate spring 15 (plate spring 15a and plate spring 15b) as a restricting member for restricting movement in the optical axis direction of the sleeve 13, and a magnetic ring 16 as a magnetic member. The lens, the coil 14 and the magnetic ring 16 are mounted on the sleeve 13 and they are moved by the plate spring 15 and thus they structure a movable body in accordance with an embodiment of the present invention. In this embodiment, the magnetic ring 16 is a magnetic member having a circular ring shape and a magnetic spring action is provided together with the magnet 12.

In this embodiment, the support body 11 is structured so as to surround an outer periphery of the sleeve 13 and is mainly structured of the cover 113 disposed on the object side, the base portion 114 disposed on the image sensor element side, and the case body (yoke) 112 surrounding the outer periphery of the sleeve 13. The case body is structured of a magnetic member such as a steel plate and functions as a back yoke for the magnet 12. Further, the sleeve 13 is formed with abutting parts 17 and 18 for restricting a moving amount in the optical axis direction of the sleeve 13.

The magnet 12 is disposed on the inner peripheral side of the support body 11 and a magnetic circuit is structured by using the magnet 12, the support body 11 and the coil 14 to drive the sleeve 13 in the optical axis direction. Therefore, these elements function as a magnetic drive mechanism for driving the sleeve 13 in the optical axis direction. The magnet 12 is formed in a cylindrical shape which is similar to the sleeve 13. The magnet 12 is concentrically disposed on an outer side of the sleeve 13 with the optical axis "L" as the center. In this embodiment, the magnet 12 is not limited to a cylindrical shape but may be formed in a triangular pole shape which is respectively disposed at four corners of a rectangular-cylindrical yoke. In this case, inner peripheral faces of four magnets 12 disposed at the four corners, in other words, four faces opposite to the outer peripheral face of the sleeve 13 are required to be concentrically disposed with the optical axis "L" as the center.

As described above, a magnetic circuit (magnetic path) is formed by the support body 11, the magnet 12 and the coil 14 and, in this state, when an electric current is supplied to the coil 14, an electromagnetic force (magnetic repulsive force) is generated and thus the sleeve 13 is driven in the optical axis direction by the electromagnetic force (non-energized position shown in FIG. 1(a)→energized position shown in FIG. 1(b)). Since the magnetic circuit is formed as described above, magnetic flux generated from the magnet 12 are guided to the opposite pole of the magnet 12 through the case body (yoke) 112 and thus leakage of the magnetic flux can be reduced and efficiency can be improved. In other words, strength of the magnetic flux which is passed between both end faces of the magnet 12 through the magnetic circuit can be enhanced and an electromotive force induced in the coil 14 can be enhanced.

When an electromagnetic force is generated by the magnetic drive mechanism, the plate spring 15 restricts movement in the optical axis direction of the sleeve 13 which is moved by the electromagnetic force. Therefore, the sleeve 13 is stopped at a desired position when the plate spring 15 is balanced with the electromagnetic force. In other words, the plate spring 15 is an example which functions as a restricting member. In this embodiment, the plate spring 15 is a metal spring which is also used for supplying an electric current to the coil 14. The plate spring 15 is comprised of two pieces of plate springs 15a and 15b which are provided at both ends (front end and rear end) in the optical axis "L" direction of the sleeve 13. The most inner ring-shaped portions of the plate springs 15a and 15b are respectively placed on the front end and the rear end of the sleeve 13. Mounting parts on the outer side of the plate springs 15a and 15b are mounted on the support body 11 and a plurality of arm parts which connects the mounting part with the ring-shaped portion is formed in each of the plate springs 15a and 15b. Therefore, the sleeve 13 is moved in a front or rear side direction of the sleeve 13 by using elastic forces of a plurality of the arm parts disposed around the sleeve 13 and by using an electromagnetic force generated by the magnetic drive mechanism.

Further, in this embodiment, as shown in FIG. 1(a), even when the lens drive device 1 is not energized, i.e., even when the sleeve 13 is located at a normal photographing position (non-energized position), the plate spring 15 (15a and 15b) applies an urging force to the sleeve 13 toward the base portion 114 which is the image sensor element side of the support body 11. In other words, the sleeve 13 is pressed to be abutted with the base portion 114 of the support body 11 through the abutting part 17 to be located at the non-energized position.

Further, as shown in FIG. 1(a), the magnetic ring 16 is disposed at a front side end part of the sleeve 13, i.e., the magnetic ring 16 is disposed on the magnet 12 side of the abutting part 18 and on the front side of the plate spring 15a (energized position side). In other words, the magnetic ring 16 is disposed on an opposite side (front side) to the magnet 12 with respect to the plate spring 15a. Therefore, the end part of the sleeve 13, the plate spring 15a and the magnetic ring 16 are disposed in the optical axis direction in this order. According to the structure as described above, a distance between the magnetic ring 16 and the magnet 12 is larger than that between the magnetic member 106 and the magnet 104 shown in FIGS. 4(c) and 4(d). Therefore, in this embodiment, an effect due to the magnetic attractive force between the magnetic ring 16 and the magnet 12 which affects the movement in the optical axis direction of the sleeve 13 becomes smaller in comparison with the conventional case.

Figure 4A:
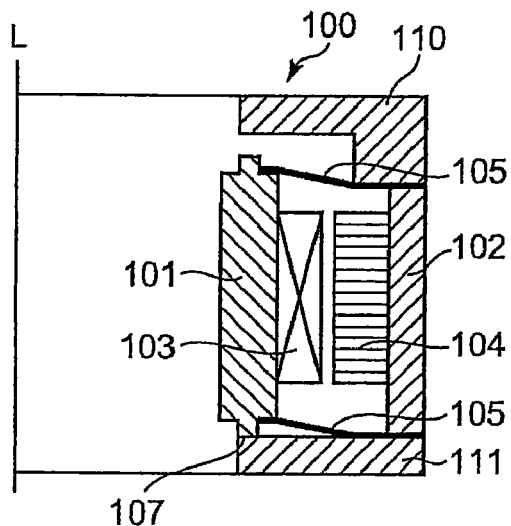
FIG. 4(a) through 4(d) are cross sectional schematic views showing right half sides of conventional lens drive devices.
Figure 4B:
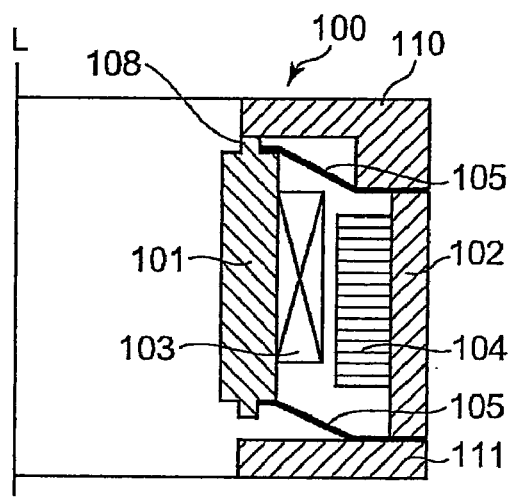
Figure 4C:
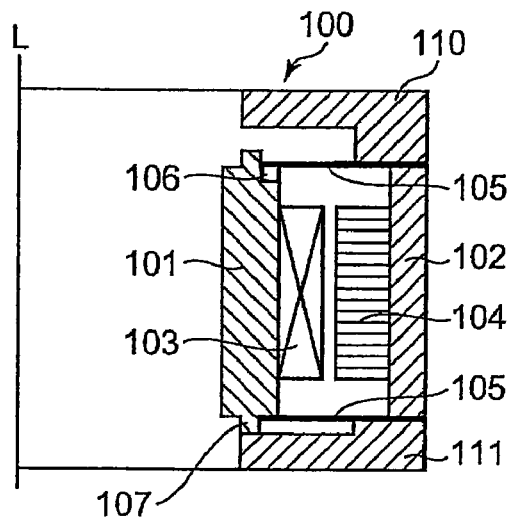
Figure 4D:
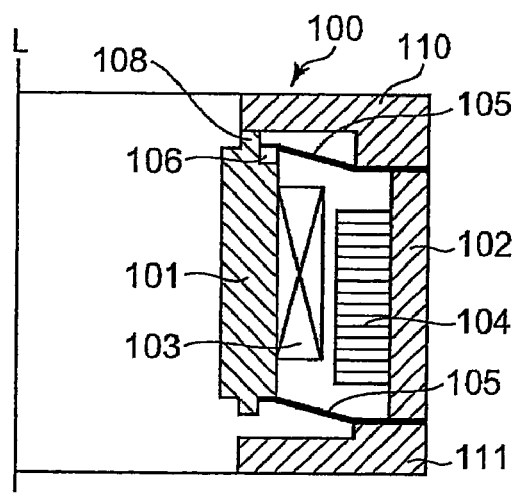

In other words, in the conventional lens drive device shown in FIGS. 4(c) and 4(d), the magnetic member 106 is located on the image sensor element side with respect to the plate spring (restricting member) 105 in the optical axis direction. However, in the lens drive device 1 in accordance with this embodiment, the magnetic ring 16 is located on the object side with respect to the plate spring 15a in the optical axis direction, i.e., on the opposite side to the coil 14 with respect to the plate spring 15a. Therefore, a force of the perpendicular component (force component in the radial direction) to F1 of the magnetic attractive force acting between the magnetic ring 16 and the magnet 12 becomes smaller in comparison with the conventional case. Therefore, the movable body (for example, sleeve 13) is prevented from being inclined after the sleeve 13 has been assembled into the lens drive device 1 and, as a result, deterioration of its optical characteristics can be prevented.

In accordance with this embodiment, the lens drive device 1 is structured so that the following relationships are satisfied:

W>F1, W>F2, and W<F1+F2 wherein, when the coil 14 is not energized, i.e., at the non-energized position of the sleeve 13, "F1" is the force in the optical axis direction of the plate spring 15 which urges the movable body (sleeve 13, coil 14, a lens and the like) toward the non-energized position; "F2" is the force with which the magnetic ring 16 is attracted toward the non-energized position by the magnet 12 (force component parallel to "F1"); and "W" is the weight of the entire movable body comprised of the sleeve 13, the coil 14, the lens and the like. Specifically, the relationships are described with reference to enlarged views in FIGS. 2(a) and 2(b).

Figure 2A:
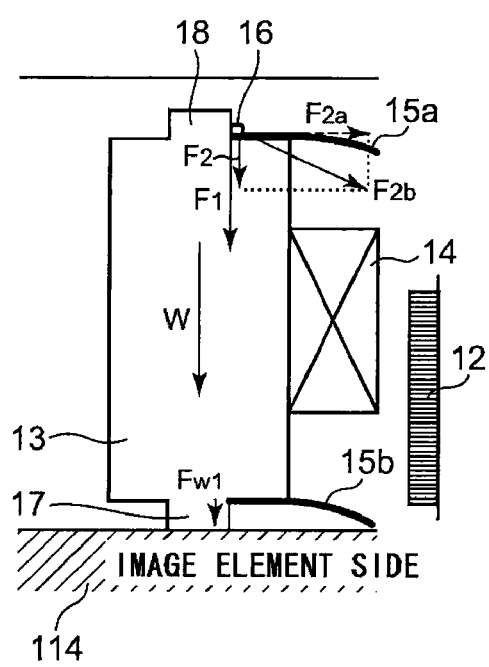
FIGS. 2(a) and 2(b) are enlarged schematic views showing different states in the portion shown by the dotted line in FIG. 1(a).
Figure 2B:
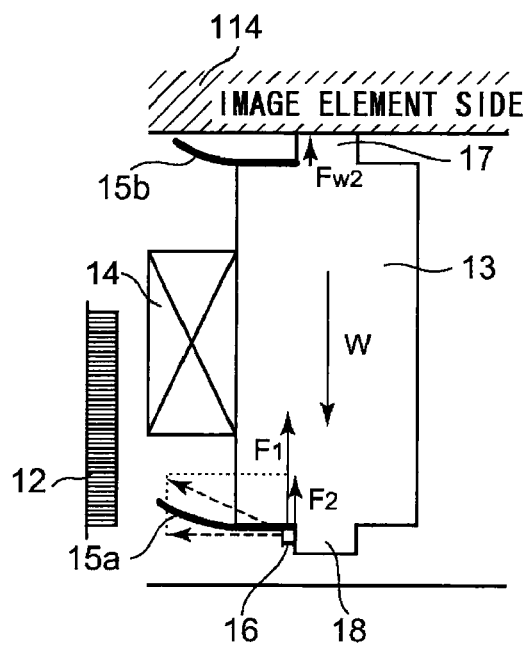

FIGS. 2(a) and 2(b) are enlarged schematic views showing different states in the portion shown by the dotted line in FIG. 1(a). FIG. 2(a) shows a state where the lens drive device 1 is located at a normal position in a positive direction when the coil is not energized, and FIG. 2(b) shows a state where the lens drive device 1 is placed upside down when the coil is not energized.

In the both cases in FIGS. 2(a) and 2(b), the sleeve 13 and the inner peripheral face of the magnet 12 are concentrically disposed with the optical axis "L" as the center. In other words, the sleeve 13 and the magnet 12 are disposed so as to have a predetermined gap space in the radial direction. Therefore, as shown in FIG. 2(a), when a force which is magnetically attracted between the magnet 12 and the magnetic ring 16 is set to be "F2b", components of the force "F2b" are divided into a force "F2a" which is applied in the radial direction and a force "F2" which is applied to a direction perpendicular to the force "F2a" (optical axis "L" direction). As described above, since the sleeve 13 is concentrically disposed with the magnet 12, a distance between the sleeve 13 and the magnet 12 is constant. Therefore, since the forces "F2a" in the radial direction are the same magnitude and their directions are opposite, i.e., 180 degrees to each other, the forces "F2a" in the radial direction of the magnetic ring 16 are canceled with each other and their total sum becomes zero. In other words, in the force "F2b" which magnetically attracts the magnetic ring 16, only the force "F2" acting in the optical axis "L" direction is required to be considered as the force applied to the sleeve 13 in this embodiment.

In the lens drive device 1 shown in FIG. 2(a), the entire weight "W", the urging force "F1" by the plate springs 15a and 15b, the magnetic attraction force "F2" to the magnetic ring 16 by the magnet 12 act downward on the movable body such as the sleeve 13 at the non-energized position. In other words, the sleeve 13 is pressed to be abutted with the base portion 114 of the support body 11 through the abutting part 17 by the force "Fw1" (=W+F1+F2).

The lens drive device 1 shown in FIG. 2(b) is in a non-energized state where the lens drive device 1 shown in FIG. 2(a) is placed upside down. In this case, different from the case shown in FIG. 2(a), the direction of the weight "W" of the entire movable body acting on the sleeve 13 (downward in the drawing) and the direction of the urging force "F1" and the magnetic attraction force "F2" acting on the sleeve 13 (upward in the drawing) are opposite to each other. However, in this embodiment, the relationship of "W<F1+F2" is satisfied. Therefore, the sleeve 13 is maintained in a state where the sleeve 13 is pressed to be abutted with the base portion 114 through the abutting part 17 with the force Fw2 (=F1+F2−W), in other words, at the same non-energized position as the non-energized position shown in FIG. 2(a).

Therefore, even when the lens drive device 1 is directed in the positive direction shown in FIG. 1(a) or is positioned upside down when the coil 14 is not energized, the sleeve 13 is pressed to be abutted with the base portion 114 of the support body 11 by the resultant force of the urging force "F1" and the magnetic attraction force "F2". Therefore, shock resistant property is provided in the lens drive device 1 when the coil 14 is not energized and, even when a large shake or impact occurs, inclination of the sleeve 13 can be prevented. Further, different from the conventional lens drive device 100 shown in FIGS. 4(a) and 4(b), the relationships of "W>F1" and "W>F2" are satisfied instead of "W<F1". Therefore, a bending amount of the plate spring 15 when the coil 14 is not-energized can be reduced. As a result, a bending amount of the plate spring 15 when the coil 14 is energized can be also reduced and thus, even when the plate spring 15 is made smaller or thinner, its hysteresis characteristic can be improved without exceeding a predetermined spring deflection limit value. As a result, fatigue failure of the plate spring 15 as the restricting member can be prevented.

Further, as described above, the magnetic ring 16 is disposed in the vicinity of the abutting part 18 which is provided at the front side end part of the sleeve 13 and is disposed on the opposite side to the magnet 12 with respect to the plate spring 15a, in other words, on the front side of the plate spring 15a (energized position side). Therefore, the magnetic attractive force between the magnetic ring 16 and the magnet 12 can be reduced in comparison with the conventional case. Accordingly, assembling accuracy is not required to improve so much and workability is not deteriorated in order to arrange the sleeve 13 and the magnet 12 in a concentric manner with respect to the optical axis "L". In other words, after the sleeve 13 and the magnet 12 have assembled into the lens drive device 1, the sleeve 13 is prevented from being inclined due to an effect of the magnetic attractive force in the radial direction and, as a result, deterioration of optical characteristics can be prevented.

FIGS. 3(a) through 3(d) are cross sectional schematic views showing right half sides of lens drive devices 1A and 1B in accordance with another embodiment of the present invention.

Figure 3A:
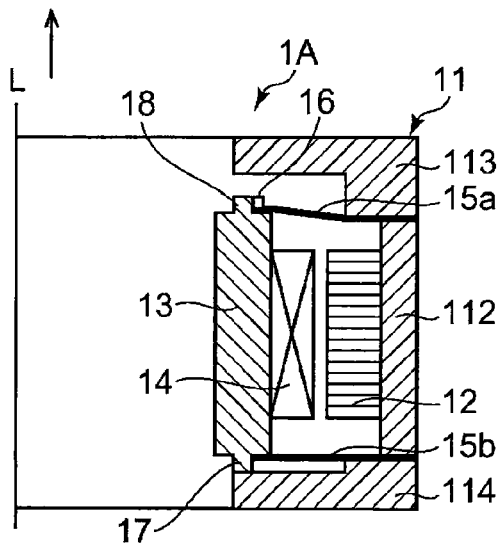
FIGS. 3(a) through 3(d) are cross sectional schematic views showing right half sides of lens drive devices in accordance with another embodiment of the present invention.
Figure 3B:
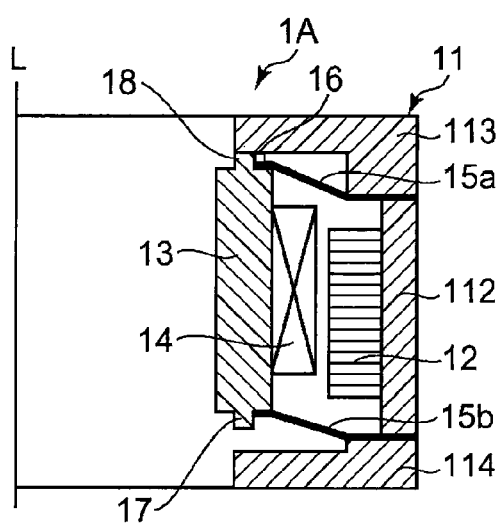

In the embodiment described above, both of the plate springs 15a and 15b are resiliently bent so as to apply urging forces to the sleeve 13 when the coil 14 is not energized. However, the present invention is not limited to this embodiment. For example, as shown in FIG. 3(a), at the non-energized position of the sleeve 13 when the coil 14 is not-energized, it may be structured so that the plate spring 15b is set to be in a flat shape and only the plate spring 15a is resiliently bent to apply an urging force toward the base portion 114 of the support body 11. In this case, when the coil 14 is energized, the plate spring 15b is not resiliently bent so much (see FIG. 3(b)) and thus the durability of the plate spring 15b can be enhanced. Also in this embodiment, the relationships of "W>F1", "W>F2" and "W<F1+F2" are satisfied.

Figure 3C:
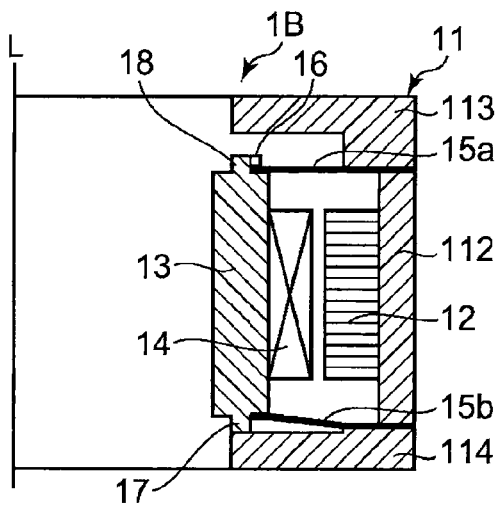
Figure 3D:
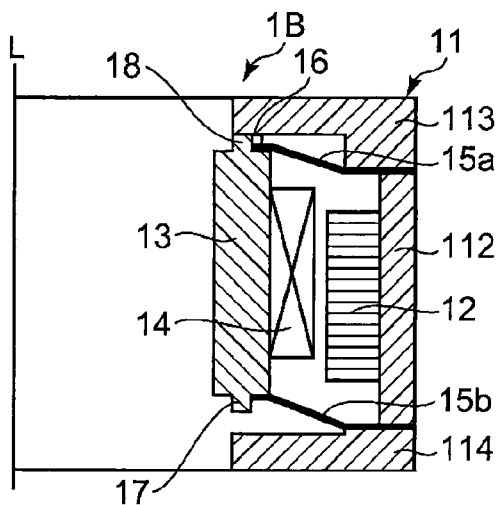

Similarly, as shown in FIG. 3(c), when the coil 14 is not energized, it may be structured so that the plate spring 15a is set to be in a flat shape and only the plate spring 15b is resiliently bent to apply an urging force toward the base portion 114. In this case, when the coil 14 is energized, the plate spring 15a is not resiliently bent so much (see FIG. 3(d)) and thus the durability of the plate spring 15a can be enhanced. Also in this embodiment, the relationships of "W>F1", "W>F2" and "W<F1+F2" are satisfied.

As described above, when the coil 14 is not energized, one of the plate springs 15a and 15b may be formed in a flat shape. Further, a bending amount of the plate spring 15 may be set in an appropriate value. In addition, the magnetic circuit is not limited to the structures as shown in FIG. 1(a) through FIG. 3(d). Any kind of structure which is capable of generating a thrust force may be utilized as the magnetic circuit. In the embodiments described above, the coil 14 and the magnet 12 are faced each other in the radial direction but the present invention is not limited to this structure. For example, a structure may be utilized in which the coil 14 is interposed between two magnets 12.

The position of the magnetic ring 16 is not limited to the position shown in this embodiment. In other words, the magnetic ring 16 may be disposed anywhere in which a magnetic attractive force is generated by the magnet 12 and the relationships of "W>F1", "W>F2" and "W<F1+F2" are satisfied For example, in FIG. 1(a), the magnetic ring 16 may be disposed on the optical axis "L" side of the sleeve 13 and on the inner side of the abutting part 18.

The lens drive devices 1, 1A and 1B described above may be mounted on various electronic apparatuses in addition to a cell phone with camera. For example, the lens drive device may be mounted on a PHS, a PDA, a bar code reader, a thin-type digital camera, a monitoring camera, a camera for rear confirmation in a car, a door having optical authentication function or the like.

The lens drive device in accordance with embodiments of the present invention is effective in order to prevent fatigue failure of a restricting member or deterioration of an optical characteristic.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
a movable body having a lens and a coil;
a support body which movably supports the movable body in an optical axis direction of the lens;
a magnetic drive mechanism which is provided with a magnet for driving the movable body together with the coil that is mounted on the movable body in the optical axis direction;
a restricting member for restricting movement in the optical axis direction of the movable body due to an electromagnetic force which is generated when an electric current is supplied to the coil; and
a magnetic member which is disposed in the movable body as a part of the movable body to be magnetically attracted by the magnet;
wherein the movable body is provided with a sleeve which is movably supported in the optical axis direction by the restricting member, and the sleeve is moved to an energized position from a non-energized position by the magnetic drive mechanism when the electric current is supplied to the coil, and the magnetic member is disposed at a tip end portion on an energized position side of the sleeve;
wherein, in a non-energized state where the coil is not energized and the sleeve is located at the non-energized position, following relationships are satisfied:
W>F1, W>F2, and W<F1+F2
wherein a force with which the restricting member urges the movable body toward a non-energized position in the optical axis direction at the non-energized position is "F1"; a force in the optical axis direction with which the magnetic member is attracted toward the non-energized position by the magnet at the non-energized position is "F2"; and a weight of the entire movable body is "W"; and wherein the forces "F1" and "F2" are forces whose directions are the same as each other and urge the sleeve toward the non-energized position and keep the non-energized position.

2. The lens drive device according to claim 1, wherein the restricting member is a plate spring, the magnet is fixed on the support body, and the magnetic member is disposed at a tip end portion on an energized position side of the sleeve.

3. The lens drive device according to claim 2, wherein the plate spring comprises two pieces of metal plate spring which are attached to both ends in the optical axis direction of the sleeve and are used for supplying the electric current to the coil.

4. The lens drive device according to claim 1, wherein the sleeve is provided with an abutting part, and the support body is provided with a base portion, and in the non-energized state, the abutting part of the sleeve is pressed and abutted with the base portion of the support body.

* * * * *